(12) United States Patent
Buteau (10) Patent No.: US 9,628,544 B2
(45) Date of Patent: Apr. 18, 2017

(54) DISTRIBUTED BUILD AND COMPILE STATISTICS

(71) Applicant: AppDynamics, Inc., San Francisco, CA (US)

(72) Inventor: Andrew Patrick Buteau, Sunnyvale, CA (US)

(73) Assignee: AppDynamics, Inc., San Francisco, CA (US)

( * ) Notice: Subject to any disclaimer, the term of this patent is extended or adjusted under 35 U.S.C. 154(b) by 0 days.

(21) Appl. No.: 14/530,440

(22) Filed: Oct. 31, 2014

(65) Prior Publication Data

US 2016/0124721 A1    May 5, 2016

(51) Int. Cl.
*G06F 9/44*    (2006.01)
*H04L 29/08*    (2006.01)

(52) U.S. Cl.
CPC ............. *H04L 67/02* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 7,272,820 B2* | 9/2007 | Klianev | ............... | G06F 9/5038 717/101 |
| 8,832,644 B2* | 9/2014 | Hirsch | ............... | G06F 8/20 717/107 |
| 2005/0177828 A1* | 8/2005 | Graham | ............... | G06F 11/1469 717/175 |
| 2007/0069850 A1* | 3/2007 | Anderson, Jr. | ........ | G05B 15/02 340/3.51 |
| 2008/0288337 A1* | 11/2008 | Snyder | ............... | G06Q 30/02 705/14.46 |
| 2010/0205591 A1* | 8/2010 | Barsness | ............... | G06F 8/4432 717/158 |
| 2010/0262948 A1* | 10/2010 | Melski | ............... | G06F 8/71 717/101 |
| 2012/0260240 A1* | 10/2012 | Arnott | ............... | G06F 8/71 717/151 |
| 2013/0152047 A1* | 6/2013 | Moorthi | ............... | G06F 11/368 717/124 |
| 2013/0205278 A1* | 8/2013 | Hirsch | ............... | G06F 8/20 717/121 |

* cited by examiner

*Primary Examiner* — Daxin Wu
(74) *Attorney, Agent, or Firm* — Bachmann Law Group (57) ABSTRACT

The present technology adds code to a top level build configuration file of a configuration program that will gather metrics for each invocation of a build. These metrics are sent to a commonly accessible metric server for future analysis. The metrics are collected for a distributed engineering team over several machines. Compilation time metrics may then be collected for each compilation event and those metrics are analyzed by a common aggregator.

30 Claims, 7 Drawing Sheets

DISTRIBUTED BUILD AND COMPILE STATISTICS

BACKGROUND OF THE INVENTION

It is important for software companies to efficiently develop their code. Companies that provide software utilize engineers to create and develop their code. It is common in engineering organizations to use continuous integration environments. These environments may be tightly coupled to code revision systems. When engineers check in code, it typically automatically starts a build. A typical compilation on a local machine happens may take several minutes, for example five to six minutes. During this time, an engineer is typically idle. Though an engineer may check e-mail or do other tasks, it is generally more likely that an engineer will not be very productive during the build time. As such, time taken to build and compile code has a tangible cost to how quickly engineers can innovate.

It would be desirable to be increase efficiency of coding for engineers of software companies.

SUMMARY

The present technology adds code to a top level build configuration file of a compilation program that will gather metrics for each invocation of a build. These metrics are sent to a commonly accessible metric server for future analysis. The metrics are collected for a distributed engineering team over several machines. Compilation time metrics may then be collected for each compilation event and those metrics are analyzed by a common aggregator.

An embodiment may include a method for monitoring an application. An agent. The method may determining the time required to complete a build on a computing device. Build data and machine hardware data may be collected for the computing device performing the build. The build data and machine hardware data may be transmitted to a remote server. Data for a plurality of builds may be reported by the remote server, the plurality of builds done for a plurality of engineers in a distributed engineering group.

An embodiment may include a system for monitoring a business transaction. The system may include a processor, a memory and one or more modules stored in memory and executable by the processor. When executed, the one or more modules may determine the time required to complete a build on a computing device, collect build data and machine hardware data for the computing device performing the build, transmit the build data and machine hardware resource to a remote server, and report data for a plurality of builds by the remote server, the plurality of builds done for a plurality of engineers in a distributed engineering group.

DETAILED DESCRIPTION

The present technology adds code to a top level build configuration file of a configuration program that will gather metrics for each invocation of a build. These metrics are sent to a commonly accessible metric server for future analysis. The metrics are collected for a distributed engineering team over several machines. Compilation time metrics may then be collected for each compilation event and those metrics are analyzed by a common aggregator.

Figure 1:
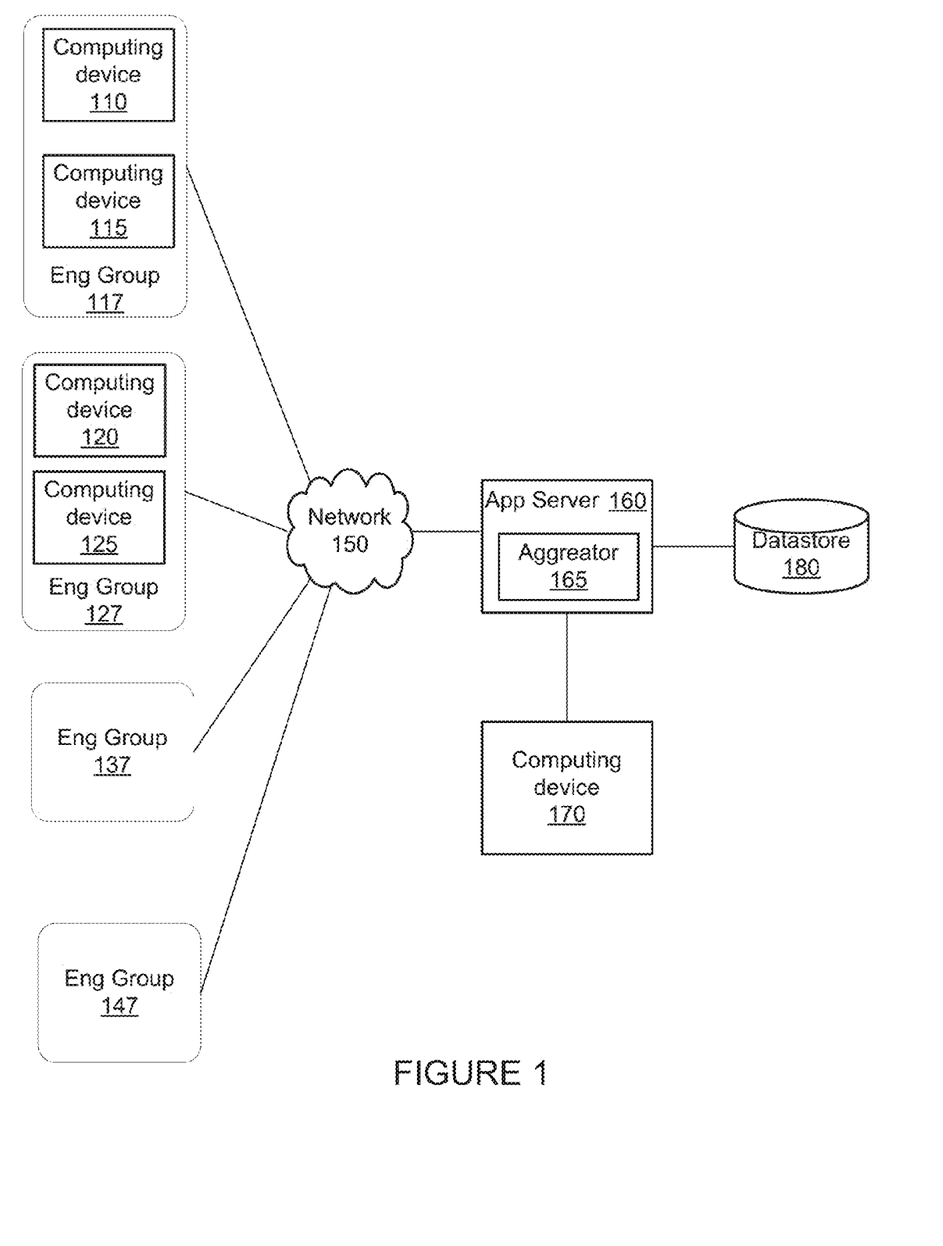
FIG. 1 is a block diagram of a system for collecting build and compilation statistics.

FIG. 1 is a block diagram of a system for collecting build and compilation statistics. The system of FIG. 1 includes computing devices 110, 115, 120, and 125. Machines 110 and 115 may be in a first engineering group 117 while machines 120 and 125 may be in another engineering group 127. Additional engineering groups 137 and 147 may also include one or more machines associated with an engineer. The computing devices in multiple engineering groups form a distributed group of engineers over multiple engineering groups within an organization.

Each engineer's machine may communicate with a server 160 over network 150. Network 150 may include a private network, public network, cellular network, wireless network, or other network. Application server 160 may include aggregator 165. The server and engineer machines may communicate over network 140. Aggregator 165 may receive build and compilation data from the engineering groups, aggregate the data, and store the aggregated data in data store 180. An administrator at computing device 170 may query the aggregated data stored in data store 180.

Figure 2:
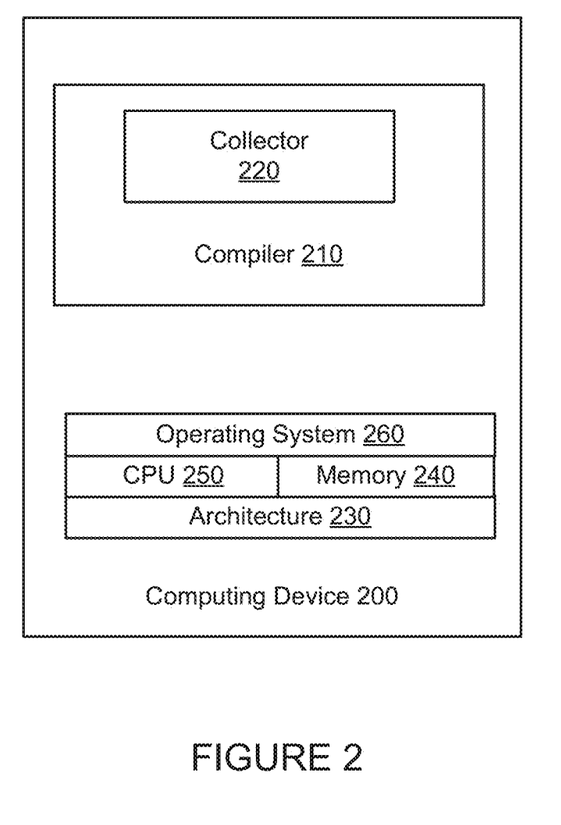
FIG. 2 is a block diagram of a local machine having a compiler.

FIG. 2 is a block diagram of a computing device with a compiler. Machine 200 may include compiler 210 having collector 220. Compiler 210 may be used by an engineer to compile code. Collector 220 may collect information regarding the compilation and transmit that data to aggregator 155.

The collector may retrieve information from the build process, other actions performed by an engineer at the machine, as well as host machine data. The engineer actions may include cleaning an environment, set-up an environment, reset applications, and deploying applications. The host machine data may include information regarding architecture 230, CPU 250, memory 240, and operating system 260.

Figure 3:
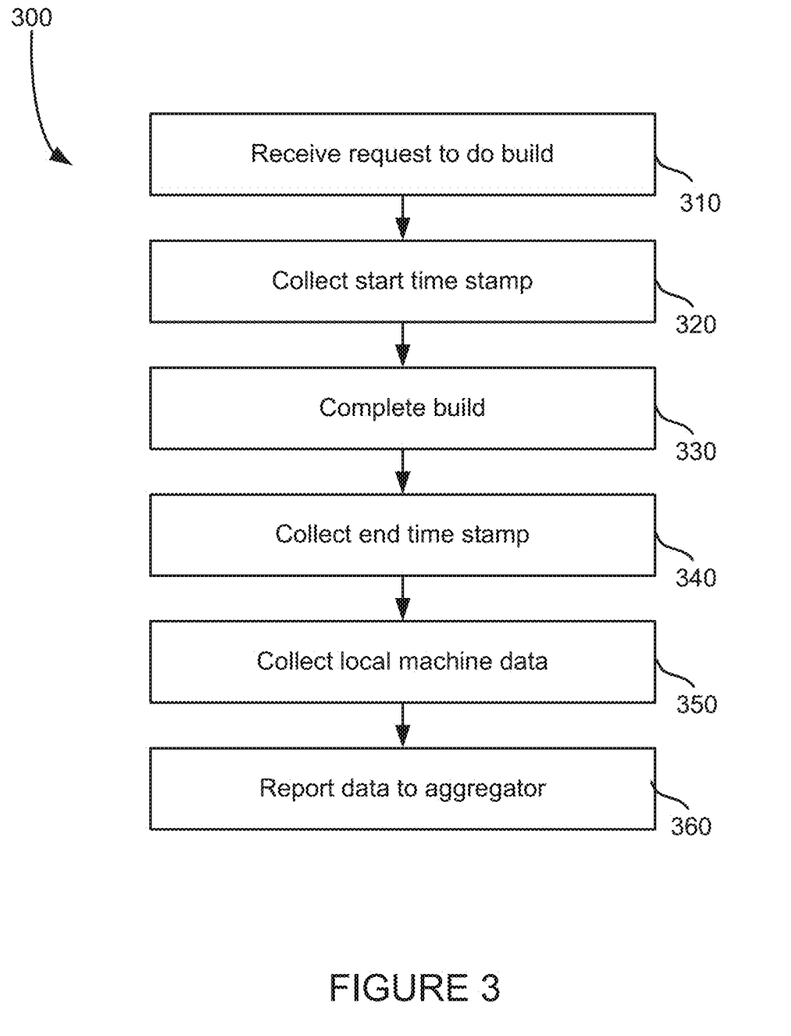
FIG. 3 is a method for generating build and compilation statistics.

FIG. 3 is a method for collecting build and compilation statistics. The method of FIG. 3 begins with receiving a request to do a build at step 310. The request may be received by a machine such as computing device 110, from an engineering at the machine. A time stamp is then collected at step 320. The time stamp represents the start time of the build.

A build is started and eventually completes at step 330. The build may complete in a successor failure. An end time stamp is collected at step 340. After collecting the start and end time stamp, local machine data may be collected at step 350. The local machine data may include information regarding machine software and hardware which may be used to provide context to the build at the local machine. Collecting local machine data is discussed in more detail below with respect to the method of FIG. 4.

After collecting time stamp data and local machine data, the collected data is reported to aggregator 155 at step 360. The data may be reported periodically, based on a non-periodic event such as a anomaly, or some other event.

Figure 4:
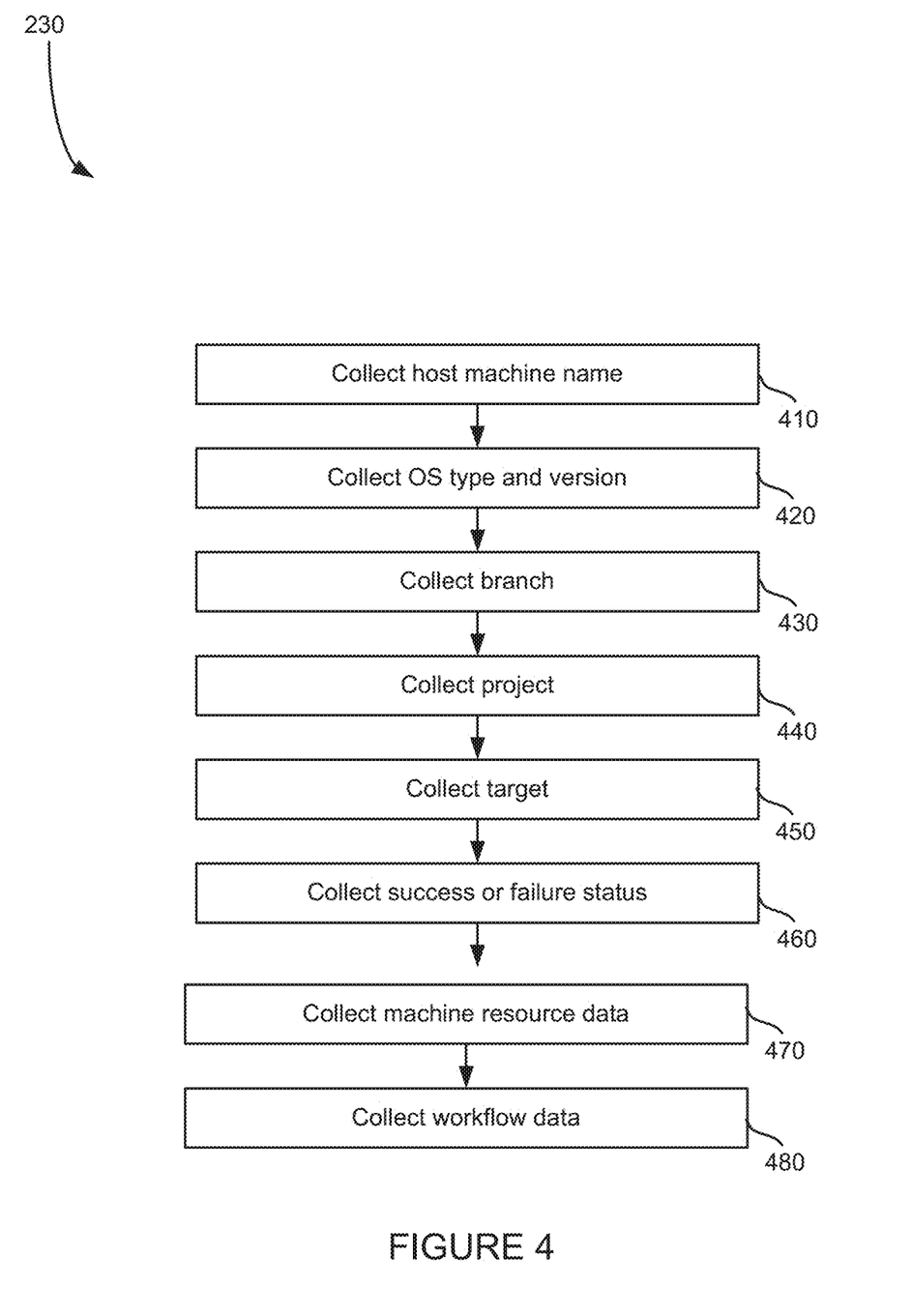
FIG. 4 is a method for collecting local machine data.

FIG. 4 illustrates a method for collecting local machine data. The method of FIG. 4 may provide more detail for step 350 of the method of FIG. 3. First, a host machine name may be collected at step 410. An operating system type and version may then be collected at step 420. Branch data may be collected at step 430. Project data may be collected at step 440. Target data may then be collected at step 450. Hardware information and other instructions may be collected from the local machine as well. Machine resource data may be collected at step 470. The machine resource data may include CPU capability, memory capability, host machine architecture information, and other data. Workflow data may then be collected at step 480. The workflow data may include one or more instructions or steps performed by an engineer before the build was started.

Figure 5:
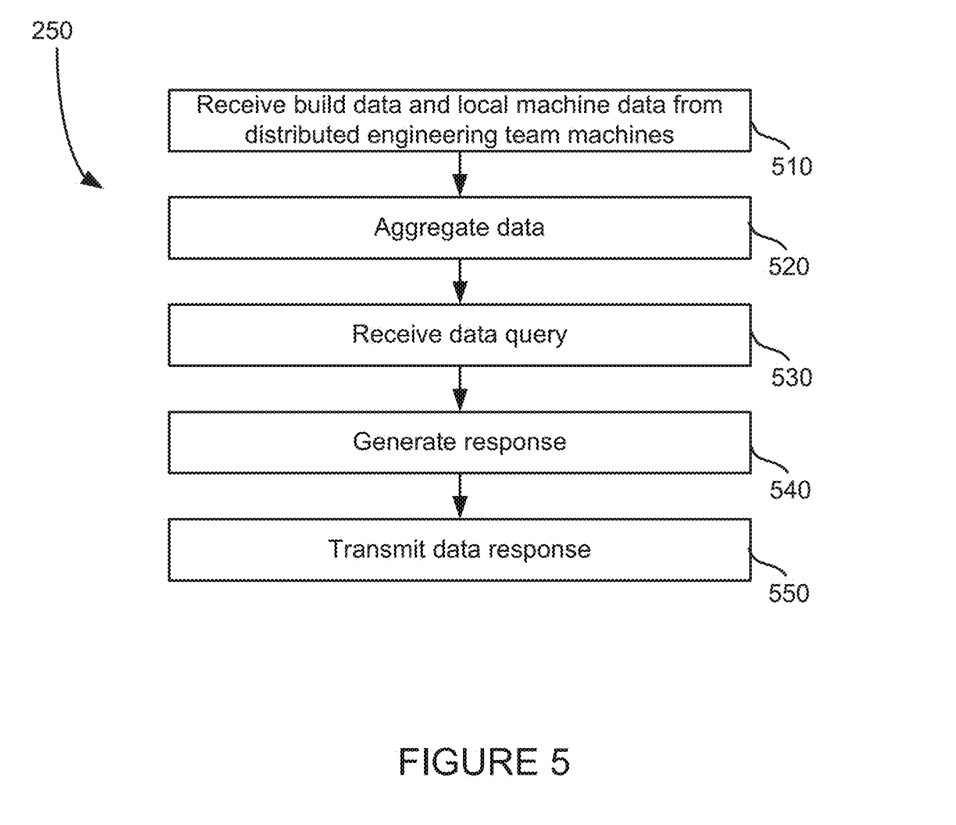
FIG. 5 is a method for aggregating build and compilation statistics.

FIG. 5 is a method for aggregating data. The method of FIG. 5 may be performed by aggregator 155 on server 150. First, build data and local machine data is received from machines of a distributed engineering team at step 510. The received data may be aggregated at step 520. The aggregation may be done to create groups of data based on the dimensions of the received data. For example, the aggregated data may be by operating system, branch, project, target, result (success or failure), machine resources, workflow data, or other data.

A data query may be received at some point at step 530. The query may specify a particular slice of data from the aggregated data stored at data store 160. A response is generated at step 540 and the response is then transmitted to the requesting computer 170 at step 550.

Figure 6:
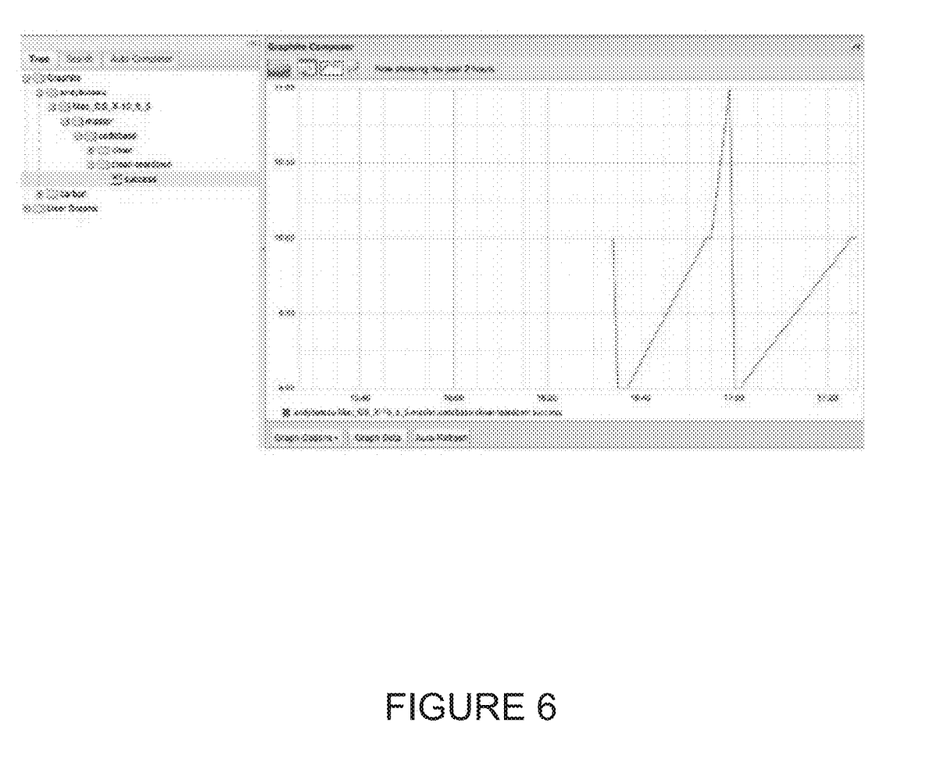
FIG. 6 is an illustration of an interface for viewing build and compilation information.

FIG. 6 is an illustration of an interface for viewing build and compilation information. The interface includes data from monitoring engineers in a distributed engineering group as well as hierarchical data. The interface may include a tree of dimensions for the collected data. In FIG. 6, the OS type is Mac_OS and the version is 10.9.5, the branch is 'master', the project is 'codebase', the target is 'clean' and the result of the compilation was a 'success.' The interface also illustrates multiple data points for builds that had the indicated set of dimensions.

Figure 7:
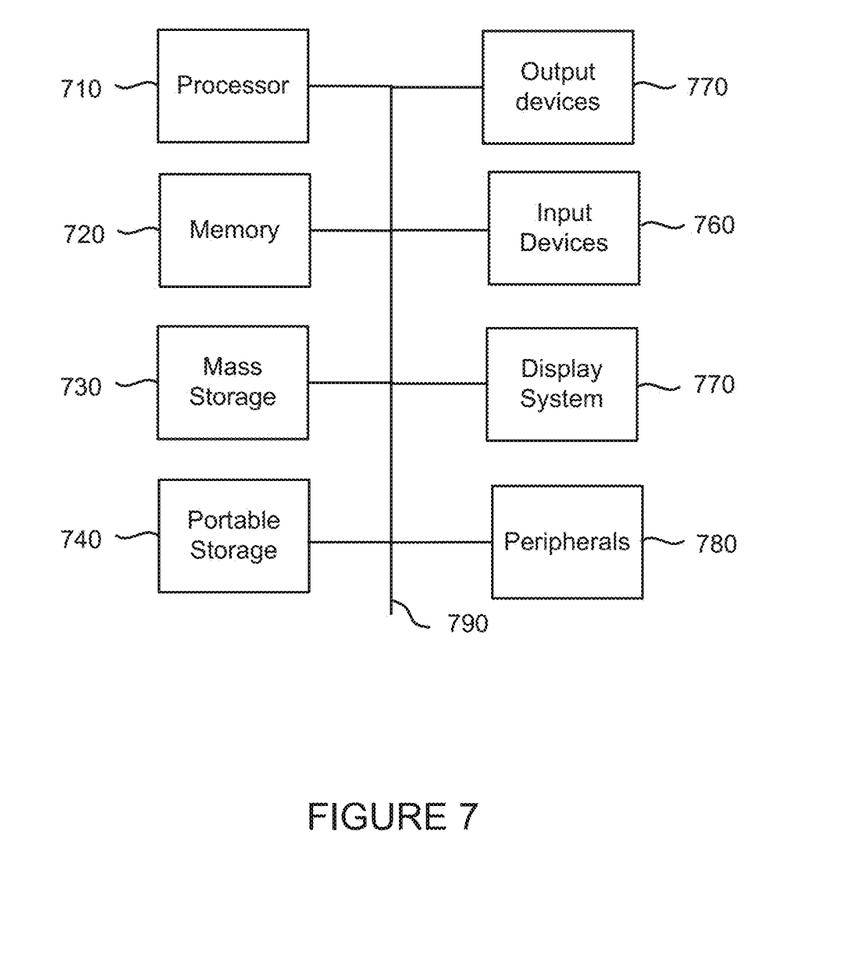
FIG. 7 is a block diagram of a computing environment for implementing the present technology.

FIG. 7 is a block diagram of a computing environment for implementing the present technology. System 700 of FIG. 7 may be implemented in the contexts of the likes of computing devices 110, 115, 120, 125, and 170, application servers 160, and data stores 180. A system similar to that in FIG. 7 may be used to implement mobile device 115, but may include additional components such as an antenna, additional microphones, and other components typically found in mobile devices such as a smart phone or tablet computer.

The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 710.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include an LED, liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, iOS, Android and other suitable operating systems.

When implementing a mobile device such as smart phone or tablet computer, the computer system 700 of FIG. 7 may include one or more antennas, radios, and other circuitry for communicating over wireless signals, such as for example communication using Wi-Fi, cellular, or other wireless signals.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for processing data regarding a program build at a plurality of distributed computing devices, the method comprising:

receiving a request to perform a build of a program from each of the plurality of distributed computing devices;

receiving time stamp data representing start and end times for completing the build of the program on each of the plurality of distributed computing devices;

receiving build data and local machine data for each of the plurality of distributed computing devices completing the build of the program, wherein the build data and local machine data for each of the plurality of distributed computing devices provide context for completing the build of the program at each of the plurality of distributed computing devices;

aggregating the received time stamp data, build data, and local machine data associated with the build of the program at each of the distributed computing devices to create aggregated groups of data based on dimensions of the received time stamp data, build data, and local machine data;

receiving a query for a particular slice of the aggregated groups of data; and generating a response to the receive query to return the requested particular slice of the aggregated groups of data.

2. The method of claim 1, wherein the aggregating to create the groups of data based on the dimensions of the received time stamp data, build data, and local machine data include aggregating data by operating system data, branch data, project data, target data, result of the build data, machine resources data, or workflow data.

3. The method of claim 1, including:
providing an interface for viewing information from the received time stamp data, build data, and local machine data.

4. The method of claim 3, wherein providing the interface includes providing a graphical user interface.

5. The method of claim 1, wherein receiving the build data includes receiving information regarding an operating system of each of the distributed computing devices.

6. The method of claim 1, including:
receiving work flow data including one or more instructions performed at each of the distributed computing devices before start of the build of the program.

7. The method of claim 1, wherein receiving the local machine data includes:
memory and processor data of each of the distributed computing devices completing the build of the program.

8. The method of claim 1, including:
analyzing the received time stamp data, build data, and local machine data for the plurality of distributed computing device completing corresponding builds of programs.

9. A system for processing data regarding a program build, comprising: a processor;
a memory; and
one or more modules stored in memory and executable by a processor to receive time stamp data representing start and end times for completing a build of a program on each of a plurality of distributed computing devices; receive build data and local machine data for each of the distributed computing device completing the build of the program, wherein the build data and local machine data for each of the distributed computing device provide context for completing the build of the program at each of the distributed computing device; aggregate the received time stamp data, build data, and local machine data associated with the build of the program at each of the distributed computing devices to create aggregated groups of data based on dimensions of the received time stamp data, build data, and local machine data; receive a query for a particular slice of the aggregated groups of data; and generate a response to the receive query to return the requested particular slice of the aggregated groups of data.

10. The system of claim 9, wherein the build data includes information on an operating system of each of the distributed computing devices.

11. The system of claim 9, wherein the build data includes build branch data.

12. The system of claim 9, wherein the build data includes build project data.

13. The system of claim 9, wherein the build data includes build target data.

14. The system of claim 9, wherein the build data includes information on whether the build was a success or failure.

15. The system of claim 9, wherein the local machine data includes memory and processor data.

16. The system of claim 9, wherein the dimensions of the received time stamp data, build data, and local machine data include operating system data, branch data, project data, target data, result of the build data, machine resources data, or workflow data.

17. The system of claim 9, wherein the one or more modules stored in memory are executable by the processor to provide an interface for viewing information from the received time stamp data, build data, and local machine data.

18. The system of claim 17, wherein the interface includes a graphical user interface.

19. The system of claim 9, the one or more modules stored in memory are executable by the processor to analyze the received time stamp data, build data, and local machine data for the plurality of distributed computing device completing corresponding builds of programs.

20. A non-transitory computer readable storage medium having embodied thereon a program, the program being executable by a processor to perform operations for collecting data regarding a program build including:
receiving time stamp data representing start and end times for completing a build of a program on each of a plurality of distributed computing devices;

receiving build data and local machine data for each of the plurality of distributed computing devices completing the build of the program, wherein the build data and local machine data for each of the plurality of distributed computing devices provide context for completing the build of the program at each of the plurality of distributed computing devices;

aggregating the received time stamp data, build data, and local machine data associated with the build of the program at each of the distributed computing devices to create aggregated groups of data based on dimensions of the received time stamp data, build data, and local machine data;

receiving a query for a particular slice of the aggregated groups of data; and generating a response to the receive query to return the requested particular slice of the aggregated groups of data.

21. The non-transitory computer readable storage medium of claim 20, wherein the aggregating to create the groups of data based on the dimensions of the received time stamp data, build data, and local machine data include aggregating data by operating system data, branch data, project data, target data, result of the build data, machine resources data, or workflow data.

22. The non-transitory computer readable storage medium of claim 20, wherein the program is executable by the processor to provide an interface for viewing information from the received time stamp data, build data, and local machine data.

23. The non-transitory computer readable storage medium of claim 22, wherein providing the interface includes providing a graphical user interface.

24. The non-transitory computer readable storage medium of claim 20, wherein receiving the build data includes receiving information regarding an operating system of each of the distributed computing devices.

25. The non-transitory computer readable storage medium of claim 20, wherein the program is executable by the processor to receive work flow data including one or more instructions performed at each of the distributed computing devices before start of the build of the program.

26. The non-transitory computer readable storage medium of claim 20, wherein the local machine data includes memory and processor data of each of the distributed computing devices completing the build of the program.

27. The non-transitory computer readable storage medium of claim 20, wherein the program is executable by the processor to analyze the received time stamp data, build data, and local machine data for the plurality of distributed computing device completing corresponding builds of programs.

28. The method of claim 3, wherein providing the interface for viewing information from the received time stamp data, build data, and local machine data include a display of a tree of dimensions of the collected data.

29. The system of claim 17, wherein the one or more modules stored in memory are executable by the processor to provide the interface to display compilation information for the aggregated groups of data.

30. The non-transitory computer readable storage medium of claim 20, wherein the program is executable by the processor to report the aggregated groups of data based on an anomaly event.

* * * * *